Patented Apr. 20, 1954

2,676,148

UNITED STATES PATENT OFFICE 2,676,148

LUBRICATING COMPOSITION CONTAINING SURFACE-ESTERIFIED SILICEOUS SOLID

Ralph K. Iler, Wilmington, Del., assignor to E. I. du Pont de Nemours and Company, Wilmington, Del., a corporation of Delaware No Drawing. Application October 23, 1950, Serial No. 191,717

9 Claims. (Cl. 252—28)

The invention relates to compositions comprising water-insoluble lubricating oils and surface-modified, finely divided siliceous solids, and to processes for making the compositions. More particularly, it relates to compositions especially greases, containing a water-insoluble lubricating oil thickened with an organophilic pulverulent solid consisting essentially of inorganic siliceous particles having large surface areas in proportion to their mass, the surface being so modified by means of chemically bound —OR groups, where R is a hydrocarbon radical, that the pulverulent solid material has greater affinity for organic liquids than for water.

This application is a continuation-in-part of my copending applications, Serial Numbers 171,759, now abandoned, and 171,760, both filed July 1, 1950, and Serial Number 130,343, filed November 30, 1949, now abandoned.

Lubricating oils have heretofore been thickened with a variety of materials. Inorganic materials including siliceous solids have been suggested. Metallic soaps are commonly used for thickening oil to make greases.

Thickened oils, such as greases, in which unmodified siliceous materials are used as the thickener or filler have a serious deficiency. They are not water resistant. On exposure to water or water vapor, such greases disintegrate by separation of oil and siliceous thickener.

It is an object of this invention to provide improved, commercially practical, thickened lubricating oils. Another object is to provide thickened lubricating oils useful as hydraulic fluids. A further object is to provide greases which, in contrast with greases prepared heretofore using metallic soaps as thickeners, have greater shear stability, are non-melting, show less change in consistency with temperature, more resistance to oxidation, less water absorption and in many cases more resistance to disintegration by water; and in contrast to greases prepared using inorganic fillers, are water resistant and in many cases more resistant to oxidation. Yet another object is to prepare solid compositions comprising pulverulent organophilic, siliceous materials treated with lubricating oils in such a manner as to render them particularly convenient to handle. It is also an object to provide practical, reproducible methods for preparing the aforementioned thickened oils, greases and oil-treated organophilic siliceous solids. Still other objects will become apparent hereinafter.

The foregoing and other objects of the invention are attained by combining a water insoluble lubricating oil with an organophilic pulverulent solid material consisting essentially of substrate particles of inorganic siliceous material having chemically bound thereto —OR groups where R is a hydrocarbon radical containing 2 to 18 carbon atoms and the carbon atom attached to oxygen is also attached to at least one hydrogen, the substrate particles having an average specific surface area of at least 25 square meters per gram.

I. ESSENTIAL INGREDIENTS

The essential ingredients used in the compositions and methods of the invention are a water insoluble lubricating oil and a specific kind of pulverulent solid referred to hereinafter as thickening agents.

The thickening agents used belong to a class of materials I have called estersils. Estersils are organophilic solids made by chemically reacting primary or secondary alcohols with certain siliceous solids. The reaction, I have called esterification and the chemically bound —OR groups resulting therefrom, I have called ester groups.

A. The thickening agents, estersils

For a detailed description of estersils and their method of preparation, reference is made to my aforementioned copending application, Serial No. 171,759, filed July 1, 1950, and abandoned November 7, 1952, and to my application Serial No. 315,930, filed October 21, 1952, now U. S. Patent 2,657,149, issued October 27, 1953, in which they are claimed. Briefly, the estersils which are employed as thickening agents in the present invention are powders or pulverulent materials having an internal structure, or "substrate," of inorganic siliceous material having an average specific surface area of at least 25 square meters per gram (25 $m.^2/g.$) to which —OR groups are chemically bound, R being the hydrocarbon radical of a primary or secondary alcohol containing 2 to 18 carbon atoms—that is, a radical in which the carbon attached to the oxygen is also attached to hydrogen.

The substrates of the estersils are solid, inorganic, siliceous materials, containing substantially no chemically bound organic groups prior to esterification, and having silanol groups (—SiOH) on their surfaces. They can be mineral or synthetic in origin and thus can be amorphous silica, insoluble metal silicates, or such silicates coated with amorphous silica. The substrate is in particulate form, the particles being of supercolloidal—that is, larger than colloidal—size, and hence generally larger than 150 millimicrons in at least one dimension. Such particles may be aggregates of much smaller particles, i. e., ultimate units, which are so firmly attached to each other that they are not readily separated by simple stirring in a fluid medium.

In estersils to be used in the present invention substrate particles are preferred in which the ultimate units have an average diameter greater than 10 millimicrons or in which the ultimate units are below 10 millimicrons and are joined in very open networks (large pore size). Preferably, the inorganic siliceous substrates used are porous—that is, they have exposed surfaces, in the interior of the particles, which are connected to the exterior so that liquid and gases can penetrate the pores and reach the exposed surfaces of the pore walls. Solids having average pore diameters of at least 4 millimicrons are especially preferred.

Suitable substrates have a specific surface area of at least 25 m.$^2$/g. and preferably of at least 200 m.$^2$/g., as determined by the nitrogen adsorption method described by P. H. Emmett in Symposium on New Methods for Particle Size Determination in Sub-Sieve Range, published by A. S. T. M., March 1941, p. 95, using a value of 0.162 square millimicron for the area covered by one surface-adsorbed nitrogen molecule in the calculations. For precipitated amorphous silica, a preferred substrate, there is an optimum range of about 200 to 400 m.$^2$/g. Very voluminous siliceous aerogels having surface acreas as great as 900 m.$^2$/g., and preferably from 200 to 900 m.$^2$/g., are very suitable substrates because of the great thickening efficiency of estersils made from them.

The pore volumes of substrates are determined from nitrogen adsorption isotherms as described by Holmes and Emmett in Journal of Physical and Colloid Chemistry, 51, 1962 (1947), and from the volumes, pore diameters are calculated, assuming cylindrical pore structure.

Determinations of particle size and shape of substrate material may be made using various microscopic techniques including the light microscope and the electron microscope, the latter being described in detail by J. H. L. Watson in Analytical Chemistry 20, 576, 1948.

While various inorganic, siliceous solids having properties as aforementioned can be used as substrates for making estersils for use in the oil-grease compositions of this invention, precipitated amorphous silica is preferred. This silica consists of coherent aggregates of non-porous ultimate units in which the ultimate units are quite uniform in size and have an average diameter greater than about 10 millimicrons or ultimate units below 10 millimicrons' diameter joined in very open networks.

Instead of silica, insoluble metal silicates can be used as the substrate. These may be prepared by treating soluble silicates with salts or hydrous oxides of metals other than alkali metals, and the insoluble silicates so obtained may be activated for surface esterification by washing with acids to remove a portion of the metal ions and leave surface silanol groups. Similarly, naturally occurring crystalline metal silicates may be acid-treated to provide esterifiable substrates. Alternatively or additionally, silanol groups can be provided on the surfaces of metal silicates by coating them with a layer of amorphous silica, as by treating sodium silicate with an acid under such conditions that the silica so formed will deposit as a coating on the mineral particles. Mineral crystalline silicates which may be treated to provide suitable substrates include asbestos, such as chrysotile; clays, such as kaolins and bentonite; and micaceous minerals, such as vermiculite.

To make an estersil for use in the present invention a suitable substrate as above described is reacted with a primary or secondary monohydric alcohol. Alcohols of this class include: Normal straight chain alcohols such as ethyl, n-propyl, n-butyl, n-amyl, n-hexyl, n-heptyl, n-octyl, n-nonyl, n-decyl, n-undecyl, lauryl, myristyl, cetyl, and stearyl; branched chain primary alcohols such as isobutyl, isoamyl, 2,2,4-trimethyl-1 hexanol and 5,7,7-trimethyl-2-(1,3,3-trimethylbutyl)-1-octanol; secondary alcohols such as isopropyl, sec-butyl, 2-pentanol, 2-octanol, 4-methyl-2-pentanol, and 2,4-trimethyl-3-pentanol; alicyclic alcohols such as cyclopentanol, cyclohexanol, cycloheptanol, and menthol; alcohols having ethylenic unsaturation such as allyl, crotyl, oleyl, citronellol, and geraniol; alcohols having acetylenic unsaturation such as propargyl; and araliphatic alcohols such as benzyl, 2-phenylethanol, hydrocinnamyl, alpha-methylbenzyl, and cinnamyl. Estersils made with the saturated primary and secondary alcohols are preferred, the preferred ester group thus being alkoxy. Technically, there is no upper limit on the number of carbon atoms in the ester group, but as a practical matter those having up to 18 carbons include the majority of groups derived from commercially available monohydric alcohols and offer a selection generally adequate. Mixtures of alcohols can be used for the esterifying agent. Alcohols containing from 3 to 6 carbons are especially preferred, since the estersils made therefrom are more stable against hydrolysis than those made from alcohols of fewer carbons and more economical to use than those made from alcohols of more carbons.

To esterify the substrate with the alcohol these two reactants are mixed under suitable anhydrous conditions. The substrate is preferably freed of extraneous material and the pH is adjusted to the range of 5 to 8 before the esterification reaction is started. During the reaction the water content of the liquid phase of the system is maintained at 5% by weight or less to give organophilic products, 3% or less for hydrophobic products, and 1.5% or less for estersils of maximum esterification. Water may be removed to below these maxima by methods known to the art, azeotropic distillation being preferred. An especially preferred practice is to use as the azeotropic dehydrating agent the alcohol, such as n-butanol, which is also being used as the esterifying agent.

The esterification reaction is carried out at an elevated temperature, the temperature having a direct bearing on the reaction time. The type of alcohol and water content are also related factors. The following table gives a typical reaction temperature, based on a one-hour reaction time and a water content below 1.5%, to give estersils of varying degrees of esterification and therefore of varying properties.

| Estersil Property | Primary Alcohols, degrees C. | Secondary Alcohols, degrees C. |
|---|---|---|
| Organophilic | 100 | 130 |
| Hydrophobic | 118 | 225 |
| Zero methyl red dye adsorption | 190 | 275 |

Temperatures substantially below about 100° C. are unsuitable. Obviously, the temperature should not exceed the thermal decomposition point of the alcohol in the presence of the substrate nor the point of thermal stability of the estersil. Preferably the heating is not prolonged any more than required to achieve esterification equilibrium.

After the esterification reaction, any excess alcohol present may be removed by conventional methods, such as distilling it off or filtering off the estersil.

The esterified inorganic siliceous solids, the estersils, are in the form of powders, or sometimes lumps or cakes pulverable under the pressure of the finger or by a light rubbing action. They are generally exceedingly fine, light, fluffy, voluminous powders, as indicated by the fact that they have low bulk densities. Especially easy to disperse in lubricating oils according to this invention are estersils having a bulk density not greater than 0.20 gram per cubic centimeter under a compressive load of 3 lbs./sq. inch, and not greater than 0.30 g./cc. at 78 lbs./sq. inch. However, in certain cases, it may be desirable to use higher bulk density material to facilitate handling.

The esterification reaction does not substantially change the structure of the inorganic siliceous solid or substrate which was esterified. In other words, the internal structure of the estersil, the structure to which the —OR groups are chemically bound, has substantially the same particle size, surface area, pore diameter, and other characteristics described previously in the discussion of the substrate material. The estersil particles are in a supercolloidal state of subdivision.

All the estersils used in the compositions and methods of the invention are organophilic. By organophilic, I mean that when a pinch of the estersil is shaken in a two-phase liquid system of water and normal butanol in a test tube, the estersil will "wet" into the n-butanol phase in preference to the water phase. In contrast, the unesterified inorganic siliceous solids are not organophilic; when tested in the above manner, they prefer the water phase.

In order to make an inorganic siliceous solid organophilic, it is necessary to react a certain minimum proportion of the surface silanol groups with an alcohol containing at least 2 carbon atoms. With most alcohols, the esterified material becomes organophilic when it contains more than about 80 ester groups per 100 square millimicrons of surface of the internal structure or substrate. The products are markedly organophilic when there are chemically attached more than about 100 ester groups per 100 square millimicrons of substrate surface.

Estersils, tho organophilic, are also hydrophilic unless more highly esterified. Thus while they prefer normal butanol to water in a butanol-water system, they will in the absence of an organic phase wet into water also. The preferred estersils, however, are those which are more highly esterified so that they are not only organophilic but are also hydrophobic, that is, they will not wet into water even in the absence of an organic phase. Such organophilic and hydrophobic products are obtained by esterifying the inorganic siliceous material to give an estersil containing at least 200 ester groups per 100 square millimicrons of substrate surface.

Hydrophobic estersils can be made without esterifying all the surface silanol groups. However, in order to obtain estersils having maximum stability toward hydrolysis, it is necessary that the ester groups be crowded together so closely on the surface that the surface is completely protected. For most ester groups, especially for those containing 3 to 6 carbon atoms, this requires at least about 270 ester groups per 100 square millimicrons. When such a completely protected surface has been obtained, the specific hydroxylated surface area, as measured by the methyl red dye adsorption test described below, is zero; in other words, essentially no methyl red dye will adsorb on the surface of the estersil.

In the case of the preferred alcohols, those containing 3 to 6 carbon atoms, it is possible to force far more than 270 alcohol molecules, say 300 to 400, to react per 100 square millimicrons of surface area of the siliceous substrate by using more severe reaction conditions, care being taken not to decompose the alcohol or resulting ester groups. Such products not only adsorb essentially no methyl red dye but exhibit outstanding stability toward water and certain other chemicals. For example greases prepared from certain of such estersils and mixed in the ratio of 9 to 1 with conventional calcium soap greases do not disintegrate but show excellent water resistant properties in a 7 day storage test at 210° F. and 100% relative humidity.

The methyl red adsorption test is carried out by agitating in 25 cc. of an anhydrous benzene solution containing 0.6 to 0.7 gram of the acid form of methyl red per liter, a suspension of a few tenths of a gram of the dried silica or estersil sample to be tested. No more than about 0.7 g. of the sample should be used in the test, and appreciably less must be used with voluminous samples to avoid getting a mixture too thick to handle. Within the latter limitations, however, the amount of sample used should provide, as near as possible, a total hydroxylated surface area of 10 m.$^2$ in the test.

The test mixture is agitated for about two hours at about 25° C. to reach equilibrium conditions; an equilibrium concentration of 400 milligrams of dye per liter insures saturation adsorption. The decrease in dye concentration in the benzene solution is determined by adsorption spectrophotometric observations at 4750 A. of both the original and equilibrium benzene solutions of methyl red.

The specific hydroxylated surface area in m.$^2$/g. is calculated from the formula $$\frac{\text{Grams dye adsorbed} \times \text{Avogadro's No.} \times 116 \times 10^{-20}}{\text{Grams silica employed} \times \text{molecular weight of methyl red}}$$

where the covering power of each adsorbed methyl red molecule is approximately 1.16 square millimicrons.

The number of ester groups per 100 square millimicrons of siliceous substrate surface is calculated from the expression:

$$\text{Surface area} = \frac{6.02 \times 10^{23} \times C}{12n \times S_n \times 10^{18}} = \frac{50,200 \times C}{n \times S_n}$$

where C is the weight of carbon in grams attached to 100 grams of substrate, $n$ is the number of carbon atoms in the —OR groups, $S_n$ is the specific surface area in m.$^2$/g. of the substrate as determined by nitrogen adsorption.

Where the sample to be analyzed is one in which the type of alcohol is unknown, the sample can be decomposed with an acid and the alcohol can be recovered and identified. The specific surface area of the substrate can be determined by first burning off the ester groups as, for example, by slowly heating the estersil in a stream of oxygen up to 500° C. and holding it there for about 3 hours and then rehydrating the surface of the particles by exposure to 100% relative humidity at room temperature for several hours, and finally determining the surface area of the remaining solid by the nitrogen adsorption method.

B. *The oil*

The oils used in the estersil-oil compositions of the invention are water-insoluble lubricating oils. Oils which contain, say, 5–10% of a water soluble component or which are themselves soluble to that extent in water can be classed as essentially water insoluble oils. However, to obtain maximum advantages of the water resistant properties of the estersils used in this invention, that the oil should have as low a solubility in water as possible, and preferably should not be soluble in water to the extent of more than about 1%.

A wide variety of oils can be used. In general, any water-insoluble animal, vegetable, mineral, or synthetic chemical having oily characteristics and lubricating or friction decreasing properties can be used.

Illustrative of suitable water-insoluble lubricating oils are: hydrocarbon oils such as naphthene base oils, paraffin base oils, and petrolatum; fluorocarbon oils such as the perfluorinated. petroleum oils; vegetable oils such as cotton seed oil and castor oil; animal oils such as sperm whale oil, lard oil, blown fish oil and degras; and water-insoluble synthetic chemicals having typical oily characteristics such as di(2-ethyl hexyl) adipate, bis-nonyl glutarate di(2-ethyl hexyl) thiopropionate, di(2-ethyl hexyl) oxydibutarate, propylene oxide-tetrahydrofuram copolymer, di(2-ethyl hexyl) sebacate; and dimethyl cyclohexyl phthalate.

The choice of a water-insoluble lubricating oil to be used is, of course, based on a consideration of the requirements of the field of application of the finished product. The considerations are analogous to those weighed in selection of an oil to be used with conventional soap thickeners. For example, illustrative of matters to be considered in choosing an oil for a given use are cost, maximum and minimum service temperature, oxidation stability, power consumption during bearing operation, chemical reactivity, and bearing enclosure design.

Thus, low cost would be a reason for choosing a petroleum oil of natural origin. Such oil is suitable for most common uses where extreme conditions are not encountered. If low temperature operation were desired, then low pour point, low viscosity, naphthene base petroleum oils, or synthetic di-ester, or polyether type oils would be favored. For high temperature operation, on the other hand, oxidation resistant and high viscosity oils would be suggested. Fuorocarbon oils should be considered where the product is to be used in corrosive chemical surroundings. Low viscosity oils are favored for use in bearings where low power consumption is desired and conversely high viscosity oils are favored where there are high bearing pressures. Tacky compositions obtainable thru the use of very high viscosity oils are used where there is poor mechanical enclosure of bearings.

In order to avoid decomposition of the estersils, the oils used in combination therewith must not contain available, highly acidic or highly basic components.

II. THE THICKENING PROCESS

The thickened oils and greases of the invention are prepared by a mixing or blending of estersils and oils. The mixing can be carried out in milling and mixing devices of the kind used heretofore for introducing other non-soap thickeners into oil. Paint mills, ink mills, colloid mills, ball mills, homogenizers, mixers of the sigma-arm type, and similar devices can be used to give the desired thorough dispersion of the estersils in the oil. The type of milling or mixing device used to carry out the dispersion depends upon the physical and chemical characteristics of the particular estersil employed. Thus, an ink mill gives very good results in most cases, whereas a homogenizer which produces high shearing forces gives maximum dispersion and thickening efficiency particularly in the thinner greases. The power requirements of the mixing operation are low, especially with estersils having an amorphous silica substrate because of the organophilic character and porous pulverulent structure of the estersils.

The proportion of estersil used as a thickening agent depends upon such factors as the character and viscosity of the oil, the nature of the thickened oil desired, and the nature of the estersil itself.

The thickening efficiency of an estersil is determined by a number of factors, such as particle shape, interaction of the surface of the particles with the oil, interaction of the particles with each other, and the ability of the particles to immobilize a film of oil around themselves. Specific surface area is one of the most important factors. Kind and degree of esterification must be considered also.

Elongated particles are more efficient thickeners than spherical ones. Such elongation exists in fibrous or plate-like particles or may be achieved by the joining together or reticulation of ultimate spherical units. Particles consisting of networks of such reticulated ultimated spherical units in which the pore diameter is greater than about 4 millimicrons are also particularly effective thickeners. The smaller the ultimate spherical units forming the network the more complex the labyrinth obtainable and the more oil which can be immobilized by a given weight of thickener. Thus it is observed that, other factors being relatively constant, the thickening efficiency is improved markedly as the unit particle size decreases as indicated by increased specific surface area. Thickening efficiency decreases somewhat as longer chain ester groups are used and also as the substrate is more completely esterified.

In general, using estersils having a specific surface area of 25 to 100 m.$^2$/g. esterified according to the preferred embodiments of the invention, from 20% to 40% by weight of estersil is required to give a medium grease consistency with Mid-Continent solvent treated petroleum oil. In contrast, the same grease consistency is obtained with the same oil using from 8 to 25% by weight of those estersils, similarly esterified, having substrate specific surface areas of 200 to 400 m.$^2$/g.

In the light of the above principles, one skilled in the art will be able to determine by a simple trial or two the amount of a given estersil needed to do the thickening job desired. In general, compositions of the invention are obtained by mixing oil and estersil in an oil:estersil weight ratio in the range of 200:1 to 0.1:1. Preferred grease compositions of the invention are obtained by using the preferred estersils having an amorphous silica substrate in an oil-estersil weight ratio of 12:1 to 3:1.

The estersil particles can be present in the compositions of the invention in the same form as that in which they were added to the lubricating oil. Also, they can be present as smaller particles resulting from milling of the estersil with oil so as to break up, at least in part, the coherent aggregate structure of the particles. In general, in the mixing and milling operation, the estersil particle size is reduced, as required, to avoid lumpiness. In the case of grease preparation, for example, the estersil structure is broken down and dispersed in the oil to the point where the grease is not lumpy and is unctuous to the touch. The grease compositions begin to feel rather smooth when the gross diameter of the estersil particles is less than about 150 microns. However, since such large particles are merely coherent aggregates of smaller ultimate units, they are usually greatly reduced in size during the milling operation. Thus, in the case of the preferred estersils based on a precipitated amorphous silica substrate having a surface area of at least 200 m.$^2$/g. and a pore diameter greater than 4 millimicrons, milling will reduce the aggregates to units smaller than 5 microns.

The nature of the esterified siliceous component of the oil-estersil compositions of the invention can be determined by first extracting the oil from the composition with a solvent and then analyzing the remaining esterified siliceous solid to determine its carbon content, identity of the ester groupings, and such properties as surface area, pore size, ultimate particle size, bulk density, and the like.

The term grease as used herein to refer to estersil-oil compositions of the invention means that the compositions have a consistency within the range conventionally ascribed to greases heretofore, namely, a micro-penetration value of from 30 to 420 at 77° F. as determined by the method described in ASTM "Standards on Petroleum Products and Lubricants," November 1949, p. 1309.

III. PROPERTIES AND USES OF THE PRODUCTS

The products of the invention range from slightly viscous fluids thru greases to hard wax-like solids depending on the proportions and types of estersil and lubricating oil used in their preparation. In general, the greater the amount of a given estersil present, the thicker and firmer the composition.

The products appear completely homogenous upon examination with the unaided eye or under a light microscope. No grit is visible. Often, especially when the preferred estersils having an internal structure of amorphous silica are used, the products are clear and transparent, thus, having improved appearance over conventional oil-metal soap greases and the usual opaque mixtures of lubricating oil and inorganic fillers.

The grease compositions of the invention have a buttery texture if the oil used in the composition is of moderate or low viscosity. With relatively high viscosity oils, say around 2000° SUS at 100° F., greases having a more tacky texture are obtained.

The semi-fluid, the grease-like, and the semi-solid compositions of the invention are particularly characterized in being substantially non-melting, even up to temperatures at which the lubricating oil phase will ignite. When heated at elevated temperature such as 210° F., or even 300° F., the grease compositions show much less decrease in consistency than soap greases and upon cooling to room temperature show little or no permanent decrease in consistency as determined by micropenetration measurements; at most, there is only a slight bleeding or separation of the oil phase. This is in contrast with most conventional soap thickened greases which ordinarily melt at 210–230° F. and often deteriorate when exposed to such conditions for long periods of time.

The grease compositions of the invention also possess excellent shear stability. This is illustrated by the face that there is little or no change in their consistency as determined by the ASTM micropenetration method after working in such devices as the Hain microworker described in Naval Research Laboratory Report TP–2817, April 1946, "A microworker for lubricating greases," by G. M. Hain.

The estersil greases have unusual water-resistant properties in comparison with conventional water-resistant calcium, aluminum, and lithium soap greases in that the estersil greases, for example, show little or no absorption of water on long exposure to humid conditions such as 150 hours at 120° F. and 100% relative humidity as indicated by the fact that the greases which are originally clear remain clear under such conditions.

The excellent lubricating properties and lack of grittiness or abrasiveness of the grease products of the invention have been demonstrated in wear tests in comparison with conventional soap greases using standard machines such as the Almen, Timken, and Cornell testers.

The lack of corrosive nature of the estersil greases is shown by standard rust prevention and copper strip tests described in the examples.

The estersil greases can be mixed with conventional water-resistant soap greases. For example, a grease prepared by mixing 10% of a calcium soap grease with 90% of an estersil grease, in which the estersil had an amorphous silica substrate having a specific surface area of 200 to 400 m.$^2$/g. and to which was chemically bound about 330 ester groups per 100 square millimicrons of surface showed no signs of disintegration or silica separation upon completing the standard water-resistance test at 120° F. and 100% relative humidity for 150 hours' exposure.

The grease compositions of the invention are useful for those lubricating purposes for which greases have been used heretofore and have many advantages as will be apparent from the foregoing discussion and from the specific examples which follow. The invention is not limited to greases however. Estersils are used to particular advantage in increasing the viscosity index of water insoluble lubricating oils. The resulting products are useful as pressure transfer media and hydraulic fluids under varied temperature conditions because of their excellent stability and body. The products of the invention especially the thickened wax-like materials are useful for application to metal surfaces to provide protective coatings and films against corrosion.

IV. EXAMPLES

The following examples illustrate the preparation of oil-estersil compositions of this invention.

Example I

A siliceous substrate was prepared as follows:

One volume of a solution of 0.48 N sulfuric acid was added at a uniform rate over a period of 30 minutes, at a temperature of about 30° C., to three volumes of a solution of sodium silicate containing 2% $SiO_2$ and having a molar $SiO_2:Na_2O$ ratio of 3.36:1. The sulfuric acid solution was chemically equivalent to 80% of the $Na_2O$ in the sodium silicate solution. Vigorous agitation was provided to insure complete and instantaneous mixing and the temperature of the reacting mass was maintained below 40° C. thruout. During the acid addition, the pH dropped from 11.3 to about 9 and the sodium ion concentration remained below 0.3 N thruout the process. A clear sol resulted.

The sol obtained by the above step contained 1.5% $SiO_2$. The solids in the sol consisted of discrete particles of silica having an average diameter less than 5 millimicrons, too small to be measured by the electron microscope.

The sol was heated to 95° C. Solutions of sodium silicate and sulfuric acid were added simultaneously at a uniform rate over a period of two hours. The sodium silicate solution added contained 10% $SiO_2$ and had a molar $SiO_2:Na_2O$ ratio of 3.36:1. The sulfuric acid was a 4% aqueous solution and was added in amount sufficient to neutralize 80% of the $Na_2O$ in the silicate solution. The addition of silicate and acid was continued until one part of $SiO_2$ had been added for each part of $SiO_2$ present in the initial sol. During the additions, vigorous agitation was employed. The pH of the mixture slowly rose from 9 to 10 during the additions and was then maintained at about 10. The sodium ion concentration remained below 0.3 N thruout the process.

During the heating of the initial sol and the subsequent addition of silicate and acid, the tiny discrete dense ultimate particles of silica increased in size they became chemically bound together in the form of open networks or coherent aggregates of super colloidal size. This action is called the "build-up" step. The aggregates precipitated so that the resulting mass was in the form of a slurry.

To aid filtration, the slurry was further flocculated with a 2% solution of a mixture of cetyl and lauryl trimethyl ammonium bromide, 0.16% of the mixed compounds being added, based on the weight of the silica. The slurry was filtered and the wet filter cake reslurried in water. The reslurry was adjusted to about pH 7 with dilute sulfuric acid, then filtered, and the filter cake washed with water. The undried filter cake as obtained on a vacuum filter contained about 12.5% $SiO_2$ by weight. The specific surface area of a sample of this substrate material, after drying in air at 120° C., was approximately 300 m.²/g. as measured by the aforementioned nitrogen adsorption method.

The esterification of the substrate was carried out as follows:

Twenty two hundred grams of the wet filter cake containing about 275 grams of silica was slurried in 6 liters of n-butanol. The slurry was placed in a 12 liter, three-necked flask equipped with an electric heating mantle, a thermometer, a mechanical stirrer, and a three-quarter inch column three feet long, packed with ⅛ inch glass helices.

The slurry was heated and material allowed to distill at a reflux ratio of about 2:1 until the distillate no longer separated into two layers and the pot temperature had risen to above 116° C. indicating that most of the water had been removed by azeotropic distillation. The heating and distillation required about 13 hours.

The slurry was then transferred to a three gallon stainless steel autoclave and heated to 200° C. under autogenous pressure. When that temperature was reached the heat was cut off and the autoclave allowed to cool to room temperature. The heating required about 2.5 hours.

The water content of the alcohol phase of the slurry in the autoclave, at the end of the treatment, was about 0.2%. The slurry was filtered and the filter cake dried at 75° C. in a vacuum oven for about 24 hours.

The dried material was a fluffy white powder. It was organophilic and hydrophobic. It had a specific surface area of 277 m.²/g. It showed no adsorption of methyl red dye indicating that the specific hydroxylated surface area was zero. The bulk density of the estersil product was 0.134 g./cc. under a compressive load of 3 p. s. i. Analysis showed that the product contained 87.67% $SiO_2$ and 6.56% carbon.

A grease was prepared using the estersil obtained above by mixing the estersil with a Mid-Continent solvent treated petroleum oil (viscosity 300 SUS at 100° F. viscosity index=100) in an oil-estersil weight ratio of 6.5:1.

The estersil was initially worked into the oil using a mortar and pestle until a fairly homogeneous mixture was obtained. The mix was then passed thru a Kent three-roll ink mill with the rolls set for clearance of 0.0015 inch. Seven passes thru the mill were made to insure complete mixing and give a homogeneous product. The grease obtained was clear and buttery. Its consistency was equivalent to about a No. 2 to No. 3 grade cup grease. It had a micropenetration value of 89 at 77° F. as measured by the A. S. T. M. micropenetration method (A. S. T. M. Bulletin No. 14, August 1947, pages 81–85).

The grease of this example had outstanding stability to elevated temperatures. Thus, the appearance and consistency of the grease remained excellent even after heating it in an oven at 140 to 150° F. in an open beaker exposed to air for 33 days. At the end of this period, its consistency, as measured by the micropenetration method, was 95 at 77° F. after being worked with a spatula roughly equivalent to about 60 strokes of an A. S. T. M. grease worker. Thus, only a slight permanent thinning of the grease had occurred.

After storage for 31 days in an oven at 210 to 220° F., the appearance of the grease was still good; it had not dried out nor had it separated or visibly bled. It had a micropenetration value of 71 after being worked with a spatula as before.

The grease did not melt at elevated temperatures, showing no dropping point up to 410 F. as tested by the A. S. T. M. standard method (A. S. T. M. D566-42, A. S. T. M. Standards Part 5, p. 940, 1949). In fact the grease did not melt even upon ignition of the oil. In contrast all soap greases have definite melting points considerably below 410° F., some of them at around 200° F.

The grease of the example was unusually resistant to moisture. This property was illustrated in a test in which a sand-blasted 2" x 4" mild steel panel was covered with about a 1/16" thick coating of the grease and was suspended in a humidity box at 100% relative humidity and 120° F. for 150 hours. The grease showed no appreciable $H_2O$ adsorption, as evidenced by retention of clarity, no separation of estersil, and did not thin out or bleed. It gave good protection against corrosion of the metal. Common sodium soap greases in contrast disintegrate under the above conditions.

The grease of the example had unusual resistance to oxidation. This property was illustrated by a test employing the standard Norma-Hoffman oxygen bomb method. In this test, the pressure had not dropped 25 p. s. i. even after 400 hours. In contrast, the average uninhibited soap grease fails in from 80 to 150 hours in this accelerated test.

The grease had excellent shear stability. It had substantially the same micropenetration value at 77° F. after 100 passes thru a 250 mesh screen in a Hain microworker as it had before the test was started. The amount of shear provided by this test is roughly equivalent to 100,000 strokes in a standard A. S. T. M. grease worker.

In wear tests run on the standard Cornell (1 lb. load on lever for 6 hours), Timken (5 lb. load on lever for 1 hour, 760 R. P. M.) and Almen (2 lb. load on lever for 1 hour) test machines, the estersil grease of this example proved to be as good or better than a variety of soap greases tested under the same conditions.

In seizure tests on the Cornell machine, the estersil grease resisted seizure at loads up to 4,000 lbs. on the lever. In contrast, the best of a variety of soap greases tested failed at about 1,250 lb. load.

*Example II*

A silica substrate was prepared in the form of a wet filter cake by the method described in Example I. The wet cake was washed by reslurrying it in acetone three times and filtering each time. The specific surface area of a portion of the acetone washed cake dried at 110° C. was 303 m.²/g. Two hundred fifty grams of the acetone washed cake (containing about 10% water) was slurried in 200 cc. of anhydrous ethanol and was then filtered. The slurrying in alcohol and filtration were repeated, and the filter cake was then suspended in 1500 cc. of ethanol.

The slurry was transferred to a 3-necked, round-bottom flask equipped with a stirrer and a fractionating column and the acetone and water removed by fractional distillation over a period of 4 hours. The slurry remaining in the distillation flask was then transferred to an autoclave and was heated to 300° C. under pressure. The heat was then cut off and the autoclave allowed to cool to room temperature. The heating step required 1 hour and 20 minutes. The suspension was then filtered and the filter cake dried at 75° C. in a vacuum oven for about 48 hours.

The dry ethyl estersil obtained from the above process was a fluffy organophilic and hydrophobic powder which adsorbed essentially no methyl red dye. Chemical analysis showed that the estersil contained 5.26% carbon, 89.42% $SiO_2$, 0.96% non siliceous ash and 1.26% hydrogen. It had a loss on ignition of 9.62%.

The ethyl estersil was milled with oil by the method described in Example 1. The oil used was the same kind employed in Example 1. The oil:estersil weight ratio used in this example was 6.84:1. The grease obtained was clear, homogeneous and buttery. Its consistency as measured by the micropenetration method was 60 at 77° F. The grease had excellent lubricating properties.

*Examples III, IV, V, and VI*

A wet acetone washed silica substrate filter cake was prepared as described in Example II. A 250 gram sample was then slurried in 1200 cc. of isobutanol and the water and acetone were removed by azeotropic distillation. The resulting slurry was autoclaved and dried as in Example II. The same process was followed using n-hexanol, n-octanol, and 2,2,4-trimethyl hexanol as the esterifying agents. In each of the experiments, the final dry alkyl estersil product was a free-flowing white powder and was organophilic, hydrophobic and adsorbed no methyl red dye.

Greases were prepared by the method of Example II using each of the above estersils. In each case, the grease was clear, homogeneous and buttery and did not melt when heated. The composition of the greases and their consistencies as measured by micropenetration values at 77° F. (designated merely as MP in the table), both before and after heat treatment, are shown in Table I below. The data show that the consistencies varied somewhat with the alcohol used and that the greases withstood long storage periods at high temperature without a serious degradation of properties.

TABLE I

| Ex. | Esterifying Agent | Oil:Silica Weight Ratio | Initial Grease Consistency, MP Value | Grease Consistency After High Temperature Storage | | | |
|---|---|---|---|---|---|---|---|
| | | | | At 140-150° F. | | At 210-220° F. | |
| | | | | Days | MP | Days | MP |
| III | Isobutanol | 6.52:1 | 125 | 16 | 115 | 4 | 117 |
| IV | n-hexanol | 5.98:1 | 108 | 30 | 102 | 30 | 57 |
| V | n-octanol | 6.62:1 | 98 | 30 | 88 | 30 | 108 |
| VI | 2,2,4-trimethyl hexanol | 5.39:1 | 108 | 16 | 119 | 4 | 131 |

Upon exposure of the greases referred to in the above table to 100% relative humidity at 120° F. for 150 hours in the standard test described in Example I, the greases remained clear and there were no signs of silica separation. Rust prevention characteristics were good.

*Example VII*

An estersil was prepared according to the method described in Example III except that "Stenol" (technical stearyl alcohol) was used as the esterifying agent and the slurry obtained after autoclaving was filtered and the filter cake then washed by reslurrying in hot methyl ethyl ketone three times and filtering after each washing. The estersil was dried at 75° C. in a vacuum oven for a period of 48 hours. The dry "Stenol" estersil was organophilic, hydrophobic and adsorbed no methyl red dye. It was a white powder with a talc-like feel.

A grease was prepared from this "Stenol" estersil using the oil and the method described in Example II. The oil:estersil weight ratio used was 4.37:1. The product was intermediate in consistency between a thin grease, having an initial micropenetration of 381 at 77° F., and the average of the other greases described in the previous examples. It was a clear homogeneous grease which did not melt upon heating. It was stable toward storage at high temperatures and toward 100% relative humidity at 120° F. The initial micropenetration value at 77° F. was 216. After 4 days storage at 210–220° F., the micropenetration value was 170 at 77° F.

*Example VIII*

A portion of the butyl estersil prepared in Example I was used in this example. It was combined by the method described in Example I with a Mid-Continent solvent treated petroleum oil having a paraffinic hydrocarbon base and a viscosity of 2,300 SUS at 100° F. The oil:estersil weight ratio was 6.14:1.

The consistency of the grease obtained was 79 as measured by the micropenetration method. The grease was clear and homogeneous but was somewhat more tacky than the buttery greases obtained by use of lower viscosity oils. It did not melt when heated.

After exposure in the standard humidity test for 150 hours at 100% relative humidity and 120° F., the grease remained clear and showed no signs of silica separation. The grease effectively prevented rust formation on the steel panel used in the humidity test. The product had excellent lubricating properties and is well adapted for use in the lubrication of automobile chassis.

*Example IX*

A portion of the butyl estersil prepared in Example I was used in this example. It was dispersed in the lubricating oil by the method described in Example I. The lubricating oil used was a Gascon West coastal oil containing predominantly naphthenic hydrocarbons and having a viscosity of 300 SUS at 100° F. The oil:estersil weight ratio used was 6.52:1.

The grease obtained had a consistency of 98 as determined by the micropenetration test. The grease was clear, homogeneous, and buttery. It had excellent lubricating properties. When subjected to the standard humidity test at 120° F. at 100% relative humidity for 150 hours, the grease showed no signs of degradation; it remained clear, showed no sign of silica separation, and had good rust prevention characteristics on the steel test panel. It did not melt when heated. It had excellent lubricating properties.

*Example X*

A butyl estersil was prepared according to the method described in Example I. The estersil obtained was similar to that of Example I except that the chemical analysis showed it to contain 86.48% $SiO_2$ and 5.69% carbon. The specific hydroxylated surface area of the estersil was 13 $m.^2/g.$ as determined by the adsorption of methyl red dye. The estersil had a bulk density of 0.102 g./cc. under a compressive load of 3 p. s. i.

The butyl estersil was dispersed in di-2-ethylhexyl sebacate by milling as described in Example I. The ester oil:estersil weight ratio used in preparing the product was 6.68:1.

A clear, homogeneous grease was obtained. It had a consistency after milling of 152, as determined by the micropenetration test. The grease was water resistant, and had good lubricating properties.

*Example XI*

The oil used in preparing the composition of this example was an unmodified polyalkylene glycol type, water insoluble lubricating oil ("Ucon" LB-300 produced by Carbon & Carbide Chemicals Corp.). It was mixed and milled with a portion of the butyl estersil prepared in Example X to give a grease which was clear and homogeneous. The glycol oil:estersil weight ratio used in preparing the grease was 6.14:1. The grease had a consistency of 97 as determined by the micropenetration test. It was water resistant. It had excellent lubricating properties.

*Example XII*

A butyl estersil was prepared for the composition of this example using as the substrate material a silica aerogel known to the trade as "Santocel C," produced by the Monsanto Chemical Co. The silica aerogel had a specific surface area of 157 $m.^2/g.$ and a specific hydroxylated surface area of 114 $m.^2/g.$ as determined by methyl red dye adsorption. The bulk density of the aerogel was 0.087 g./cc. at 3 p. s. i.; 0.139 g./cc. at 78 p. s. i.; and 0.451 g./cc. at 1560 p. s. i. above atmospheric pressure.

Eighty grams of the silica aerogel were dried at 120° C. and were slurried in 1 liter of n-butanol. The slurry was heated in a two liter stainless steel bomb to 200° C., and was then cooled to room temperature. The resulting slurry was filtered, the filter cake dried on a steam plate, and reduced to a very fine powder by grinding in a Raymond mill, and finally dried in an oven at 120° C.

The butyl estersil thus obtained was organophilic. It contained 2.18% carbon, 92.72% $SiO_2$, 0.72% hydrogen, and 1.25% non-siliceous ash. The specific hydroxylated surface area was 25 $m.^2/g.$ The estersil contained approximately 179 butoxy groups per 100 square millimicrons of surface area.

A grease was prepared by milling the butyl estersil with a Mid-Continent solvent treated 300 SUS oil according to the method of Example I using an oil:estersil weight ratio of 6.52:1.

The grease obtained had a consistency of 89 as determined by the micropenetration method. It did not disintegrate after being held for 3 days at 100% relative humidity and 120° F. It did not melt when heated. The grease had excellent lubricating properties.

*Example XIII*

A voluminous silica aerogel was reduced to a fine powder having a specific surface area as determined by nitrogen adsorption of 897 $m.^2/g.$ and a bulk density of 0.066 g./cc. under a compressive load of 3 p. s. i. A portion of the ground material slurried in water, gave a suspension having a pH of 4.

Thirty grams of the finely ground voluminous silica aerogel was slurried in 1 liter of n-butanol and filtered. The wet filter cake was reslurried in a fresh portion of n-butanol and diluted to 750 mls. The slurry was then placed in a 1 liter autoclave and the temperature was raised slowly to 310° C., the n-butanol being vented continuously to maintain the pressure at about 1150 p. s. i. All the unreacted butanol was vented when the temperature reached 310° C. About 4½ hours were required for the heating step.

The butyl estersil remaining in the autoclave was dried at 75° C. in a vacuum oven. The dried product was a voluminous powder and was organophilic and hydrophobic. Chemical analysis showed it to contain 74.74% $SiO_2$, 16.51% carbon and 0.59% non-siliceous ash and the loss on ignition was 24.67%. The estersil adsorbed essentially no methyl red dye, thus its specific hydroxylated surface area was zero.

The butyl estersil was mixed with a Mid-Continent solvent treated petroleum oil (viscosity 300 SUS at 100° F.) in an oil:estersil weight ratio of 19:1 by the method described in Example I. The resulting grease was smooth and clear. It had a consistency of 186 as determined by the micropenetration method. The grease was water resistant and had good lubricating properties. It did not melt when heated.

*Example XIV*

The grease of Example XII was diluted with a Mid-Continent solvent treated petroleum oil (viscosity 300 SUS at 100° F.) using 1.5 parts by weight of the oil for each part by weight of the grease; the oil grease combination was thoroughly mixed by stirring to give a product having an oil:estersil weight ratio of 49:1. The product obtained was a thickened, clear oil.

The effect of the butyl estersil in increasing the viscosity of the oil was demonstrated by comparing flow times of the oils between calibrations on a pipette. The original, unmodified Mid-Continent solvent treated petroleum oil had a flow time of 30 seconds while the estersil modified oil of this example had a flow time of 210 seconds.

*Example XV*

A portion of the estersil oil composition of Example XIV was diluted with a Mid-Continent solvent treated petroleum oil (viscosity 300 SUS at 100° F.) to give a product having a oil:estersil weight ratio of 99:1. The thickened, clear oil product obtained had a flow time of 60 seconds between certain calibrations on a pipette, while the original, unmodified oil had a flow time of 30 seconds between the same calibrations.

*Example XVI*

A silica substrate was prepared and esterified with butanol by a method similar to that described in Example I. The esterified product was shown to contain 6.55% carbon upon chemical analysis. It had a specific surface area of 261 m.$^2$/g.

One part of this butyl estersil was mixed with nine parts of a Mid-Continent solvent treated petroleum oil (viscosity 300 SUS at 100° F.) under vacuum in a Readco mixer to remove air bubbles. The resulting mixture was introduced into a Gaulin homogenizer and subjected to strong shearing action by being forced out through the two valves of the apparatus by means of a reciprocating piston under a 5000 lb. pressure drop equally staged across the two valves. After four such passes through the homogenizer and a 60 stroke working in the ASTM grease worker, the consistency of the grease was 95 as determined by the micropenetration method at 77° F. The grease was stable toward high temperatures showing little change in consistency. The worked micropenetration values at 77° F. after 3 to 4 days' storage at each of the following temperatures were 105 at 140–150° F., 107 at 210–220° F., and 100 at 300–310° F. The grease had good water resistance and good lubricating properties.

In order to demonstrate that superior dispersion and thickening efficiency is attained by the use of the Gaulin homogenizer, the above data may be compared with that obtained from a grease of the same composition (9 parts oil plus 1 part of the butyl estersil) milled on an ink mill by the method of Example I and then worked for 60 strokes in an ASTM grease worker. The consistency as determined by the micropenetration method at 77° F. was 140. The grease was stable toward high temperatures. The worked micropenetration values at 77° F. after 3 to 4 days' storage at each of the following temperatures were 144 at 140–150° F., 149 at 210–220° F., 164 at 300–310° F.

*Example XVII*

One thousand grams of a 3% aqueous dispersion of grit-free attapulgite clay ("Attasol" grade, Attapulgus Clay Co.) was mixed with 50 grams of 95.5% sulfuric acid and the mixture was refluxed for six hours. The slurry was filtered, washed with water on the filter, reslurried in 1 N $H_2SO_4$; refiltered, rewashed and reslurried in 600 ml. of water and adjusted to pH=7 with ammonia. The suspension was filtered, slurried in n-butanol, and the water was removed by azeotropic distillation as described in Example I. The dry butanol slurry was then transferred to an autoclave and heated to 250° C. to further esterify the siliceous substrate. The procedure including recovery of the dry estersil was similar to that described in Example I. The dry light fluffy organophilic product had a bulk density of 0.083 g./cc. under a compressive load of 3 p. s. i. The specific surface area as determined by nitrogen adsorption was 168 m.$^2$/g. The specific hydroxylated surface area was 25 m.$^2$/g. as determined by methyl red dye adsorption. Electron micrographs of such acid treated esterified attapulgite products have revealed that the particles are on the average about one micron long and 30 to 50 millimicrons wide.

One part of this butanol estersil was mixed with 9 parts by weight of the oil used in Example I and was ink milled by the method described in Example I. The resulting smooth grease had a consistency of 74 as determined by the micropenetration test at 77° F. This demonstrates the effective thickening action of this fibrous filler. The grease was stable toward high temperature storage showing micropenetration values of 80 after 3 days at 210° F. and 83 after 4 days at 300° F. The grease did not melt when heated. It was also water resistant showing no disintegration after 7 days in the standard humidity test.

The foregoing detailed description has been given for clearness of understanding only and no unnecessary limitations are to be understood therefrom. The invention is not limited to the exact details shown and described for obvious modifications will occur to those skilled in the art.

I claim:
1. A lubricating composition comprising a water-insoluble lubricating oil, said oil containing carbon as the only group IV element, and being the only lubricating oil in the composition and an organophilic pulverulent solid consisting essentially of substrate particles of inorganic siliceous material in a supercolloidal state of subdivision having chemically bound thereto per 100 square millimicrons of substrate surface at least 100 —OR groups, wherein R is a hydrocarbon radical containing 2 to 18 carbon atoms and the carbon atom attached to oxygen is also attached to at least one hydrogen, the substrate particles having an average specific surface area of from 25 to 900 square meters/gram, and the weight ratio of oil to pulverulent solid in the composition being in the range of 200:1 to 0.1:1.

2. A lubricating composition comprising a water-insoluble lubricating oil, said oil containing carbon as the only group IV element, and being the only lubricating oil in the composition and an organophilic and hydrophobic pulverulent solid consisting essentially of substrate particles of inorganic siliceous material in a supercolloidal state of subdivision having chemically bound thereto per 100 square millimicrons of substrate surface at least 200 —OR groups, wherein R is a hydrocarbon radical containing 2 to 18 carbon atoms and the carbon atom attached to oxygen is also attached to at least one hydrogen, the substrate particles having an average specific surface area of from 25 to 900 square meters per gram, and the weight ratio of oil to pulverulent solid in the composition being in the range of 200:1 to 0.1:1.

3. A lubricating composition comprising a water-insoluble lubricating oil, said oil containing carbon as the only group IV element, and being the only lubricating oil in the composition and an organophilic pulverulent solid consisting essentially of substrate particles of amorphous silica in a supercolloidal state of subdivision having chemically bound thereto per 100 square millimicrons of substrate surface at least 200 —OR groups, wherein R is a hydrocarbon radical containing 2 to 18 carbon atoms and the carbon atom attached to oxygen is also attached to at least one hydrogen, the substrate particles having an average specific surface area of from 200 to 900 square meters/gram, and the weight ratio of oil to pulverulent solid in the composition being in the range of 200:1 to 0.1:1.

4. A grease composition comprising a water-insoluble lubricating oil, said oil containing carbon as the only group IV element, and being the only lubricating oil in the composition thickened with a pulverulent solid consisting essentially of substrate particles of amorphous silica in a supercolloidal state of subdivision having chemically bound thereto per 100 square millimicrons of substrate surface at least 200 —OR groups where R is an alkoxy radical containing 3 to 6 carbon atoms and the carbon atom attached to oxygen is also attached to at least one hydrogen, the substrate particles having an average specific surface area of from 200 to 900 square meters/gram, and the weight ratio of oil to pulverulent solid in the grease composition being in the range of 12:1 to 3:1.

5. A grease composition comprising a hydrocarbon oil thickened with a pulverulent solid consisting essentially of substrate particles of amorphous silica in a supercolloidal state of subdivision having chemically bound thereto per 100 square millimicrons of substrate surface at least 200 —OR groups where R is an alkoxy radical containing 3 to 6 carbon atoms and the carbon atom attached to oxygen is also attached to at least one hydrogen, the substrate particles having an average specific surface area of from 200 to 900 square meters/gram, the hydrocarbon oil being the only lubricating oil in the composition, and the weight ratio of oil to pulverulent solid in the grease composition being in the range of 12:1 to 3:1.

6. A grease composition comprising a hydrocarbon oil thickened with a pulverulent solid consisting essentially of substrate particles of amorphous silica in a supercolloidal state of subdivision having chemically bound thereto per 100 square millimicrons of substrate surface at least 270 —OR groups wherein R is an alkoxy radical containing 3 to 6 carbon atoms and the carbon atom attached to oxygen is also attached to at least one hydrogen, the substrate particles being coherent aggregates having an average specific surface area of 200 to 400 square meters/gram, and having an average pore diameter of at least 4 millimicrons, the hydrocarbon oil being the only lubricating oil in the composition, and the weight ratio of oil to pulverulent solid in the grease composition being in the range of 12:1 to 3:1.

7. A grease composition comprising a hydrocarbon oil thickened with a powder consisting essentially of substrate particles of amorphous silica in a supercolloidal state of subdivision having chemically bound thereto per 100 square millimicrons of substrate surface at least 270 —OR groups wherein R is an alkoxy radical containing 3 to 6 carbon atoms and the carbon atom attached to oxygen is also attached to at least one hydrogen, the substrate particles being coherent aggregates having an average specific surface area of 200 to 400 square meters/gram, an average pore diameter of at least 4 millimicrons, the powder having a bulk density not greater than 0.20 gram/cubic centimeter under a compressive load of 3 lbs./square inch, and not greater than 0.30 gram/cubic centimeter under a compressive load of 78 lbs./square inch, the hydrocarbon oil being the only lubricating oil in the composition, and the weight ratio of oil to powder in the grease composition being in the range of 12:1 to 3:1.

8. A lubricating composition comprising a water-insoluble lubricating oil containing carbon as the only group IV element and being the only lubricating oil in the composition, and a pulverulent solid consisting essentially of substrate particles of inorganic siliceous material in a supercolloidal state of subdivision having chemically bound thereto —OR groups, wherein R is a hydrocarbon radical containing 2 to 18 carbon atoms and the carbon atom attached to oxygen is also attached to hydrogen, the substrate particles having an average specific surface area of from 25 to 900 square meters per gram and being organophilic, having a sufficient number of chemically bound —OR groups per unit of substrate surface area to cause them to be preferentially wetted by butanol in a butanol-water mixture, and the weight ratio of oil to pulverulent solid in the composition being in the range of 200:1 to 0.1:1.

9. In a process for thickening a hydrocarbon oil to make a grease the steps comprising mixing with the oil a pulverulent solid consisting essentially of substrate particles of precipitated, porous, amorphous silica aggregates having an average size larger than 5 microns and having a pore diameter greater than 4 millimicrons and a specific surface area of from 200 to 900 square meters per gram, the substrate having chemically bound thereto, per 100 square millimicrons of substrate surface, at least 200 —OR groups wherein R is an alkoxy radical containing 3 to 6 carbon atoms and the carbon atom attached to oxygen is also attached to hydrogen, the weight ratio of oil to said pulverulent solid being from 12:1 to 3:1, and milling the mixture under a high shearing force until the average size of the aggregates present is less than 5 microns.

References Cited in the file of this patent

UNITED STATES PATENTS

| Number | Name | Date |
|---|---|---|
| 2,249,767 | Kistler | July 22, 1941 |
| 2,260,625 | Kistler | Oct. 28, 1941 |
| 2,285,449 | Marshall | June 9, 1942 |
| 2,509,026 | White | May 23, 1950 |
| 2,573,650 | Peterson | Oct. 30, 1951 |